(12) United States Patent
Kubo et al.

(10) Patent No.: US 7,337,347 B2
(45) Date of Patent: Feb. 26, 2008

(54) INFORMATION PROCESSING SYSTEM AND METHOD FOR TIMING ADJUSTMENT

(75) Inventors: Masahito Kubo, Kawasaki (JP); Takashi Chiba, Kawasaki (JP); Masakazu Takahashi, Kahoku (JP); Shinichiro Nakamura, Kahoku (JP); Kenji Takebe, Kahoku (JP); Hirofumi Koseki, Kahoku (JP)

(73) Assignees: Fujitsu Limited, Kawasaki (JP); PFU Limited, Ishikawa (JP)

( * ) Notice: Subject to any disclaimer, the term of this patent is extended or adjusted under 35 U.S.C. 154(b) by 408 days.

(21) Appl. No.: 10/998,151

(22) Filed: Nov. 29, 2004

(65) Prior Publication Data

US 2005/0268143 A1    Dec. 1, 2005

(30) Foreign Application Priority Data

Apr. 9, 2004  (JP) .............................. 2004-115731

(51) Int. Cl.
*G06F 1/04* (2006.01)
*G06F 1/00* (2006.01)
*G06F 1/12* (2006.01)
*G06F 5/06* (2006.01)

(52) U.S. Cl. ...................... 713/503; 713/600; 713/601; 713/500

(58) Field of Classification Search ......... 713/600–601
See application file for complete search history.

(56) References Cited

U.S. PATENT DOCUMENTS 5,719,782 A * 2/1998 Mitsuoka ...................... 702/75
6,496,888 B1* 12/2002 Pole, II ....................... 710/110
6,501,815 B1* 12/2002 Stansell ........................ 377/47

FOREIGN PATENT DOCUMENTS

JP         10289031         10/1998

\* cited by examiner

*Primary Examiner*—Chun Cao
*Assistant Examiner*—Ji H Bae
(74) *Attorney, Agent, or Firm*—Staas & Halsey LLP

(57) ABSTRACT

An elapsed cycle number during the predetermined period of the inputted clock source is counted using the clock reference signal as a yardstick, a frequency of the clock source is computed based on an elapsed cycle number obtained by counting, control timing of various interfaces relating to the CPU is adjusted and an interruption generating interval in which interruption is generated regularly by the CPU so that adjustment of control timing of various interfaces and setting of a timer interruption interval during the OS operation in accordance with a frequency of the clock source without performing OS modification such as rebuilding and the like.

19 Claims, 7 Drawing Sheets

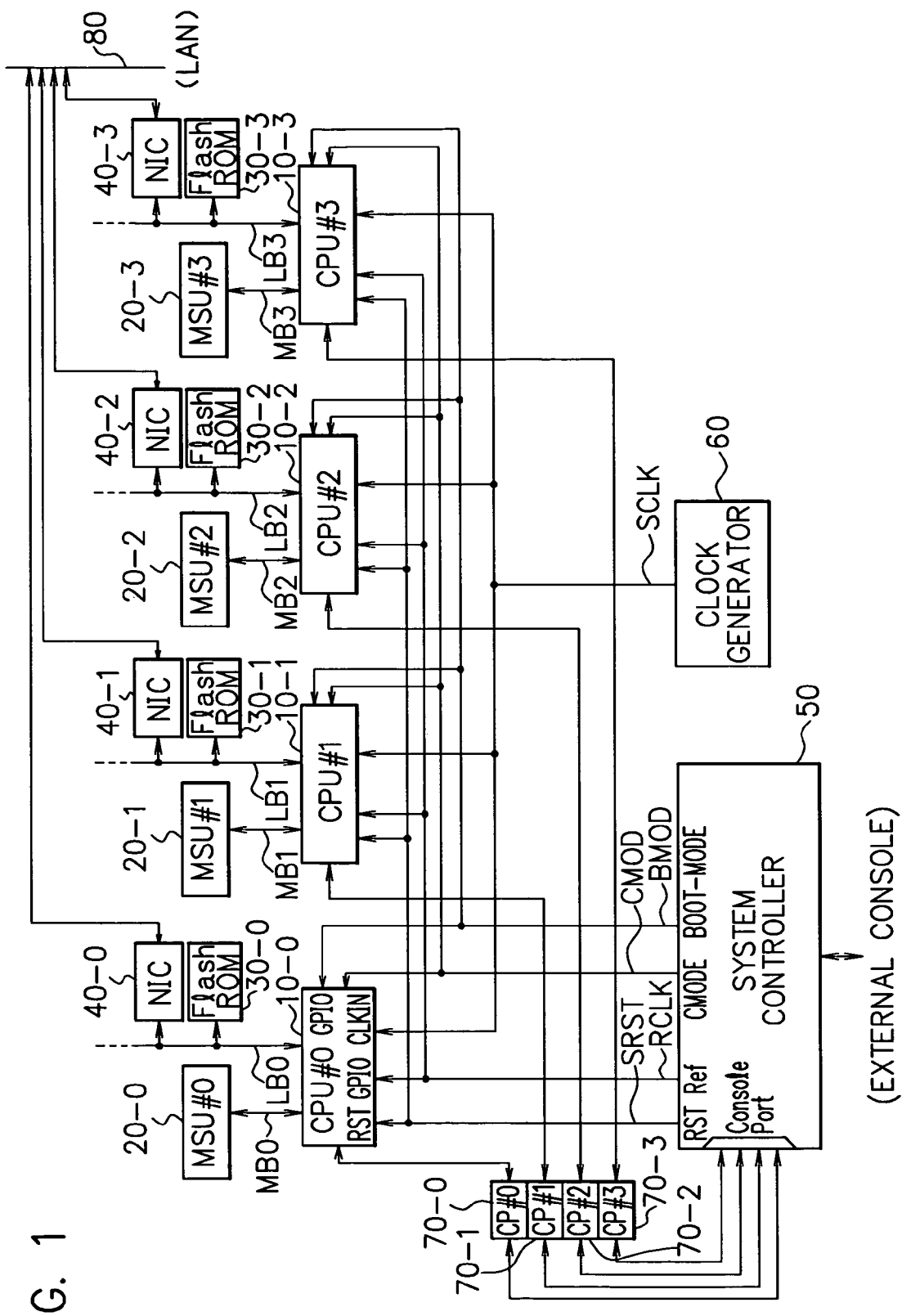
F I G. 1

INFORMATION PROCESSING SYSTEM AND METHOD FOR TIMING ADJUSTMENT

CROSS-REFERENCE TO RELATED APPLICATIONS

This application is based upon and claims the benefit of priority from the prior Japanese Patent Application No. 2004-115731, filed on Apr. 9, 2004, the entire contents of which are incorporated herein by reference.

BACKGROUND OF THE INVENTION

1. Field of the Invention

The present invention relates to an information processing system and a method for timing adjustment, and more in detail, relates to adjustment of control timing according to the frequency of a clock input signal supplied to an information processing system.

2. Description of the Related Art

In an information processing system, in order to make the life of a system in operation of one-generation design long, it is common practice to upgrade a CPU of the system to something of a higher quality after installing the system. In such a system, unification of the interface between the CPU and a system control section is generally performed so as to cope with the improvement in performance of the CPU.

Improvement in performance of a CPU is often realized by increasing a clock frequency (operating clock frequency). Setting of the clock frequency relating to a CPU is generally conducted by using plural mode pins for setting. However, it needs to dispose such a part as a pull-up resistor, a pull-down resistor, or the like required for mode pin processing, which leads to cost increase. On the other hand, proposed is a computer which makes it possible to enhance in performance of a CPU by changing a clock frequency while realizing cost reduction by eliminating such parts as a mode pin, a pull-up resistor and the like (for instance, refer to Patent Document 1).

Further, in a performance evaluation test or a shipping test of an information processing system, a marginal inspection or test including operating frequency in the system are often carried out. As for the operating frequency, a performance measurement or test is conducted to check the possible extent of increase in operating frequency of the entire system, performance exhibited by application in the system when the operating frequency is increased, or the like.

For instance, in a marginal test of the operating frequency, in order to guarantee operation at a prescribed frequency predetermined by the specification, a test program or the like is carried out with an information processing system at an operating frequency exceeding the prescribed frequency by a predetermined range, that is, at an operating frequency having a margin with respect to the prescribed frequency. In general, a marginal test for the operating frequency is carried out not by changing a clock frequency but also by appropriately changing a supplied voltage, an environmental temperature, or the like.

[Patent Document 1]

Japanese Patent Application Laid-open Hei. 10-289031

As described above, in upgrade, performance evaluation test/inspection test of an information processing system (CPU), change in the frequency of the clock signal supplied to the CPU is generally carried out.

In recent years, lots of the CPUs have built-in timer systems used in cases where an OS (operating system) in operation keeps time. Therefore, change of the clock frequency with respect to the CPU means change of timer control of the OS, and when a clock frequency is changed, the OS is generally required to be rebuilt.

Since conventional information processing systems, have had few CPUs installed, it has been possible with considerably little labor and cost to change the clock frequency. In recent years, however, the number of CPUs installed on one information processing system has a tendency to increase, and in a multiprocessor system which has installed a great number of CPUs in one system, and in which system runs a separate OS in each CPU, the labor and cost required to calibrate the clock frequency after making changes to the system have remarkably increased.

SUMMARY OF THE INVENTION

An objective of the present invention is to make it possible to easily set a suitable control timing in an information processing system according to a frequency of a clock input signal to be supplied.

The information processing system of the present invention is provided with a system control section to output a clock reference signal and a clock input signal having a frequency higher than that of the clock reference signal, and a microprocessing section, the clock reference signal and the clock input signal being supplied and composed including a processor. The microprocessing section generates an internal clock signal from the clock input signal, computes a frequency value of the clock input signal using the clock reference signal, and adjusts control timing of an interface embedded in the microprocessing section and operating by the internal clock signal, based on the computed frequency value of the clock input signal.

Through this configuration and functions, if the frequency of the clock input signal supplying to the microprocessing section is changed, since the microprocessing section itself computes a frequency value of the clock input signal using a clock reference signal which will be a yardstick, and automatically adjusts a control timing of an interface embedded in the microprocessing section according to the computed frequency value, it becomes possible to easily set suitable control timing in accordance with the frequency of the clock input signal.

Furthermore, it is also necessary to set an interruption interval to generate the timer interruption periodically to an operating system based on the frequency value of the computed clock input signal. When taking this configuration, it is possible to automatically change the timer control of the operating system according to change in frequency of the clock input signal.

BRIEF DESCRIPTION OF THE DRAWINGS

FIG. 1 is a block diagram showing an example of system configuration of a multiprocessor system in an embodiment of the present invention;

DETAILED DESCRIPTION OF THE PREFERRED EMBODIMENTS

Figure 2:
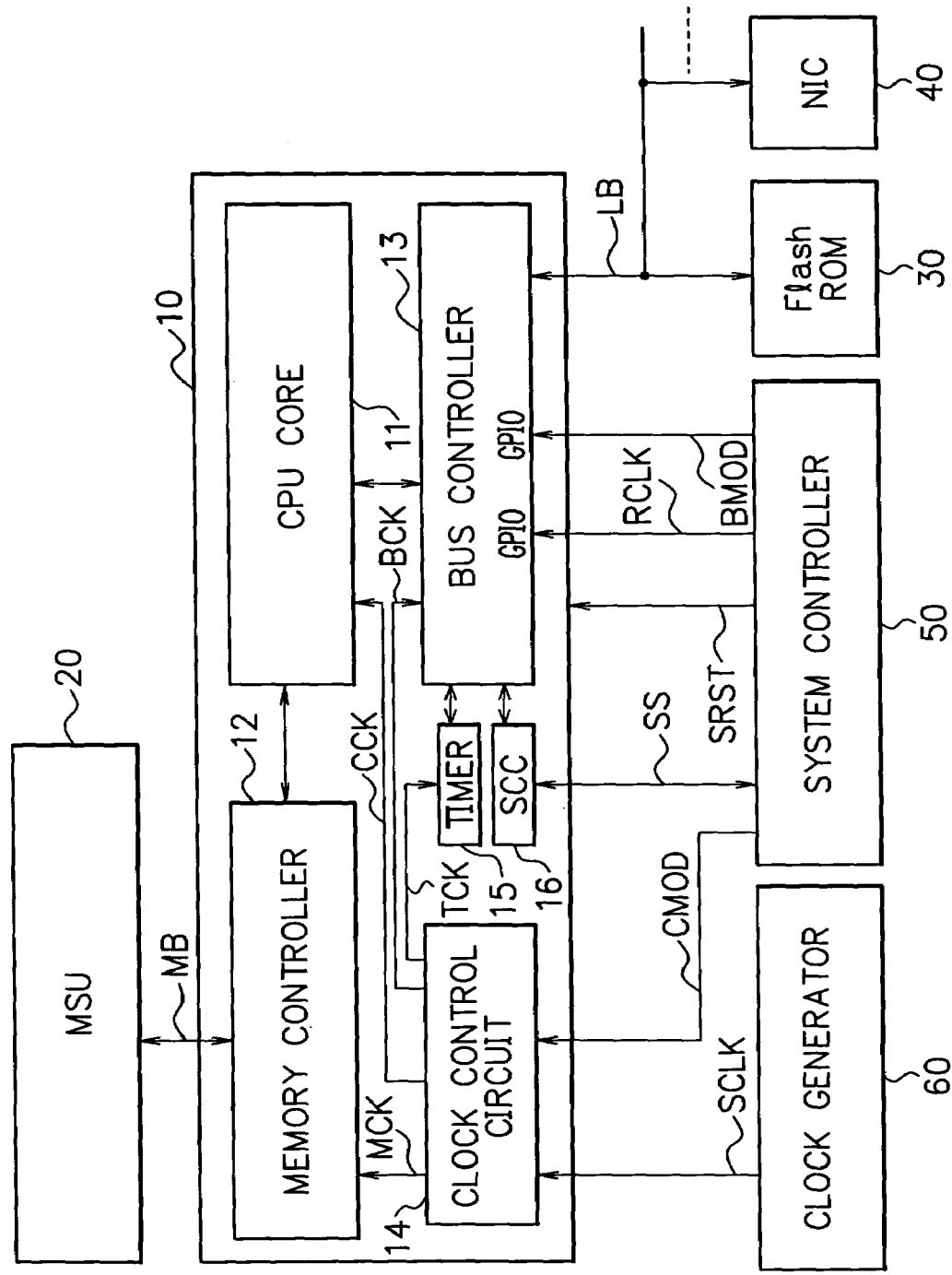
FIG. 2 is a block diagram showing an example of a CPU configuration in the present embodiment.

Hereinafter, an embodiment of the present invention will be explained using attached drawings.

FIG. 1 is a block diagram showing an example of a system configuration of a multiprocessor system applying an information processing system according to an embodiment of the present invention.

As shown in FIG. 1, the multiprocessor system of the present embodiment includes CPUs 10-$i$ which are central processing units, MSUs 20-$i$ which are main storage units, flush memories (Flash-ROMs, each hereinafter referred to as a "ROM") 30-$i$, network interfaces (NICs: Network Interface Cards) 40-$i$, a system controller 50, a clock generator 60, and console-ports (CPs: Console-Ports) 70-$i$. Incidentally, i is a subscript, and in the example shown in FIG. 1, i is an integer of 0 to 3 (the same goes to the following explanation).

The CPU 10-$i$ performs fetching, decoding, and execution of instructions composing a program. In other words, the respective CPU 10-$i$ control connected MSU 20-$i$, ROM 30-$i$, NIC 40-$i$ and so on by fetching and executing a program to perform operations described later.

Each CPU 10-$i$ is connected with the MSU 20-$i$ via a memory bus (memory interface) MBi, and connected with the ROM 30-$i$, the NIC 40-$i$, etc. via a local bus LBi. Each CPU 10-$i$ is connected to a console-port 70-$i$.

More concretely, a CPU 10-0 is connected with an MSU 20-0 via a memory bus MB 0, and is connected with a ROM 30-0, a NIC 40-0 and so on via a local bus LB 0. The CPU 10-0 is connected to a console-port 70-0. Similarly, CPUs 10-1 to 10-3 are connected with corresponding MSUs 20-1 to 20-3, ROMs 30-1 to 30-3, NICs 40-1 to 40-3, and console-ports 70-1 to 70-3 respectively.

Furthermore, a reset signal (system reset signal) SRST, a clock reference signal RCLK. a clock mode signal (clock control signal) CMOD, and a boot mode signal BMOD are supplied from a system controller 50 to the respective CPU 10-$i$, and a clock source (clock input signal) SCLK is supplied from a clock generator 60. The reset signal SRST is inputted from a reset input <RST>, and the clock source SCLK is inputted from a clock input <CLKIN>. The clock reference signal RCLK, the clock mode signal CMOD, and the boot mode signal BMOD are inputted from different general purpose input and output <GPIOs: General Purpose I/Os> respectively. Incidentally, details of respective signals will be described later.

The MSU 20-$i$ is composed of memory and the like (for instance, RAM such as SDRAM and so on) and temporarily stores programs such as OS (operating system), data and so on. The MSU 20-$i$ is used when the CPU 10-$i$ performs various kinds of controls to serve as the so-called main memory, work area, or the like of the CPU 10-$i$.

In the ROM 30-$i$, programs (boot program or boot program and OS) performed by corresponding CPU 10-$i$, data and so on, are stored. It should be noted that the present embodiment shows a flush memory as an example of the ROM 30-$i$, but it is not limited to this, and any non-volatile memory is applicable.

The NIC 40-$i$ is a communication interface to transmit/receive data or the like between the CPU 10-$i$ and external equipment via a network (LAN 80 in FIG. 1). Incidentally, though the present embodiment shows LAN 80 as an example of the network, it is not limited to this, and an arbitrary network generally used is applicable.

The system controller 50 controls the entire multiprocessor system, and outputs the reset signal SRST, the clock reference signal RCLK, the clock mode signal CMOD and the boot mode signal BMOD. The system controller 50 is connected to the CPU 10-$i$ via each console-port 70-$i$ so as to be able to communicate, and at the same time connected to an external console which can be handled by an operator or the like.

The clock generator 60 generates and outputs the clock source SCLK. The frequency of the clock source SCLK generated and outputted by the clock generator 60 can be changed voluntarily by controlling the clock generator 60. Note that the clock generator 60 can be provided inside the system controller 50.

The console-port 70-$i$ is an input/output interface to transmit/receive data and the like between the CPU 10-$i$ and the system controller 50. For instance, the console-port 70-$i$ transmits a message from an OS operating at the CPU 10-$i$ to the system controller 50 or a command from the system controller 50 to the CPU-i to communicate to an operator.

Here, the reset signal SRST, the clock reference signal RCLK, the clock mode signal CMOD, the boot mode signal BMOD and the clock source SCLK will be explained.

The reset signal SRST is a hardware reset signal to initialize each CPU 10-$i$ composing the multiprocessor system.

The clock source SCLK is a clock signal to supply to the CPU 10-$i$ as an operation clock signal.

The clock reference signal RCLK is a referece clock signal with a fixed frequency and a fixed duty ratio (clock duty) for clock adjustment, and is a relatively low frequency signal compare with the clock source SCLK. For instance, the frequency of the clock reference signal RCLK is 1 MHz while the frequency of the clock source SCLK is from 37 MHz to 66 MHz. The clock mode signal CMOD is a signal showing the relation between frequencies of the operating clock of the CPU and the control clocks of various interfaces, in more details, a signal showing a ratio of clock frequencies of a CPU core, a memory bus (memory), and a local bus shown in FIG. 2 to perform clock adjustment in the multiprocessor system. The relation between frequencies of the operation clock of the CPU and the control clocks of various interfaces, is uniquely determined according to a value shown by the clock mode signal CMOD.

The boot mode signal BMOD is a signal to instruct boot sequence.

Incidentally, a multiprocessor system composed of four CPUs 10-0 to 10-3 is shown in FIG. 1 as an example, the number of the CPUs having a multiprocessor system is optional.

FIG. 2 is a block diagram showing a configuration example of a CPU 10-$i$.

Note that since configurations of the respective CPU 10-$i$ are similar, only one CPU is shown in FIG. 2. Therefore, a subscript "i" attached to a symbol or a numeral in FIG. 1 is not attached. Further, in FIG. 2, the same symbol or numeral is attached to a block or the like having the same function as that of a block or the like shown in FIG. 1, and the overlapped explanation will be restrained.

The CPU 10 has a CPU core 11, a memory controller 12, a bus controller 13, a clock control circuit 14, a timer 15, and an SCC (serial communication controller) 16.

The CPU core 11 performs a computation on data in the CPU 10.

The memory controller 12 is connected to the MSU 20 via the memory bus MB, and controls the MSU 20 according to instructions from the CPU core 11. The memory controller 12 writes data into the MSU 20 or reads data from the MSU 20 according to instructions from the CPU core 11.

The bus controller 13 controls peripheral devices (ROM 30, NIC 40 and the like) connected to a local bus LB according to instructions from the CPU core 11. The bus controller 13 is connected to the timer 15 and the SCC 16. The clock reference signal RCLK and the boot mode signal BMOD are supplied from the system controller 50 to the bus controller 13.

The clock control circuit 14 is configured including a multiplication circuit and a PLL (Phase Locked Loop) circuit. The clock control circuit 14 generates respective internal clock signals CCK, MCK, BCK, and TCK having frequency ratio according to values shown by referring to a clock mode signal CMOD supplied from the system controller 50, using the clock source SCLK supplied from the clock generator 60. And the clock control circuit 14 supplies generated internal clock signals CCK, MCK, BCK, and TCK to the CPU core 11, the memory controller 12, the bus controller 13, and the timer 15, respectively. Here, the respective frequencies of the internal clock signal CCK, MCK, BCK, and TCK can be arbitrarily changeable depending on the value shown by the clock mode signal CMOD.

It should be noted that though the clock signals BCK and TCK supplied to the bus controller 13 and the timer 15 are shown as different clock signals in FIG. 2, internal clock signals supplied to the bus controller 13 and the timer 15 can be the same clock signal. Furthermore, the clock control circuit 14 can be provided with a clock divider circuit.

The timer 15 performs time keeping operation based on the supplied clock signal TCK, and in this embodiment, it is configured including a decrement counter which decrements a value by 1 for every one cycle of the clock signal TCK.

The SCC 16 is a serial communication controller for receiving and transmitting data via a console port 70 between the CPU 10 and the system controller 50.

A functional organization of the CPU 10 shown in FIG. 2 will be explained next.

Figure 3:
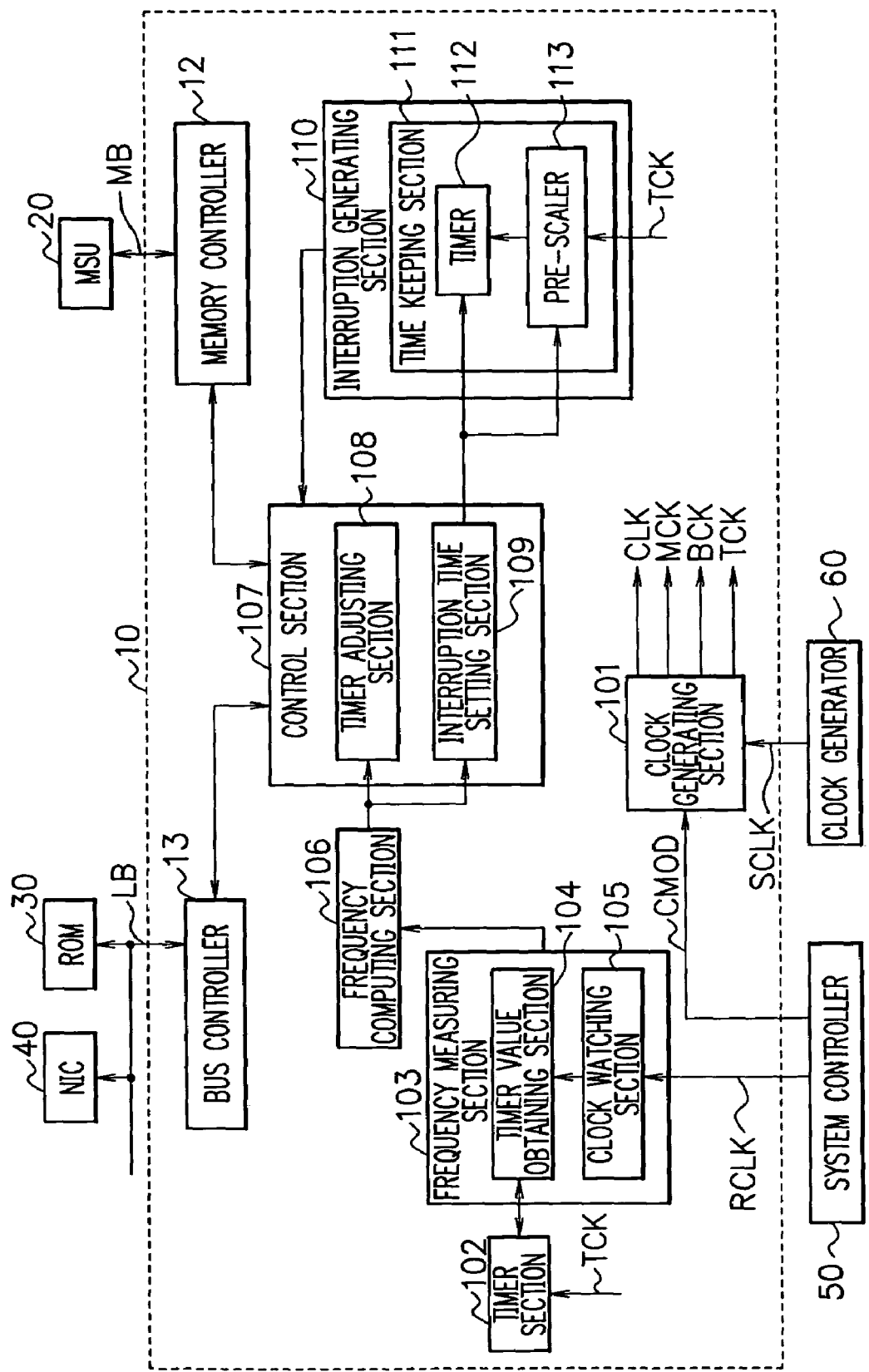
FIG. 3 is a block diagram of the CPU in the present embodiment.

FIG. 3 is a block diagram of the CPU 10, and shows only essential characteristics here. Incidentally, in FIG. 3, the same symbols or numerals are attached to block and the like having the same function as that of the block and the like shown in FIG. 2, and overlapping explanation thereof will be restrained.

In the present embodiment, the following respective functional sections 103, 104, 105, 106, 107, 108, 109, and 110 are configured from the boot program stored in, for instance, the ROM 30, and the functional section 101 is configured from the clock control circuit 14. Following functional sections 102, 111, 112, and 113 are configured from the timer 15.

In FIG. 3, the clock generating section 101 is supplied with the clock mode signal CMOD from the system controller 50 and the clock source SCLK from the clock generator 60, and generates and outputs the internal clock signals CCK, MCK, BCK, and TCK.

The timer section 102 is a timer of which values are updated by a clock signal TCK (for instance, the same frequency as that of the clock source SCLK) outputted from the clock generating section 101, and in this embodiment, the value is decremented by 1 for every one cycle of the clock signal TCK.

A cycle number counting section 103 comprises a timer value obtaining section 104 and a clock watching section 105. The cycle number counting section 104 measures the elapsed cycle number of the clock source SCLK during the measurement period defined by the clock reference signal RCLK supplied from the system controller 50. The timer value obtaining section 104 obtains and keeps timer values from the timer section 102 according to instructions from the clock watching section 105. The clock watching section 105 watches the supplied clock reference signal RCLK, and instructs the timer value obtaining section 104 to obtain a timer value when a situation value of the clock reference signal RCLK is changed.

A frequency computing section 106 computes a frequency value of the clock source SCLK based on cycle information (measurement period) of the clock reference signal RCLK and the elapsed cycle number of the clock source SCLK measured by the frequency measurement section 103.

A control section 107 controls respective functional sections in the CPU 10 in generalities, and includes a timing adjusting section 108 and an interruption time setting section 109.

The timing adjusting section 108 adjusts control timing of respective interfaces 12 and 13 embedded in the CPU 10 according to a frequency value of the clock source SCLK computed by the frequency computing section 106.

The interruption time setting section 109 sets an interruption interval to generate interruption regularly to the OS to provide timing service and the like when the OS is in operation in the CPU 10 as will be described later. More concretely, the interruption time setting section 109 sets an appropriate value (initial value) to a timer 112 and a pre-scaler 113 so as to make an interruption time measurable at a time keeping section 111 based on the frequency value of the clock source SCLK computed at the frequency computing section 106.

An interruption generating section 110 generates regular interruption INT to the working OS in the CPU 10 based on time measured at the time keeping section 111.

The time keeping section 111 measures time according to the clock signal TCK (clock source SCLK) and includes the timer 112 and the pre-scaler 113. The timer 112 corresponds to a first timer in the present invention, and the pre-scaler 113 corresponds a second timer in the present invention. The pre-scaler 113 is provided as a pre-stage timer for the timer 112, and updates values by the clock signal TCK (clock source SCLK). The pre-scaler 113 decrements by one for every one cycle of the clock signal TCK, and notifies the timer 112 when the value reaches "0". The timer 112 updates values in response to the pre-scaler 113 and decrements values by one every time it receives a notice. A period from when an initial value is set to the timer 112 to the time when the value reaches "0" (zero) corresponds to a period generating the interruption INT, and the period can be appropriately changed according to the initial value set to the timer 112 and the pre-scaler 113. In short, a generation period of the interruption INT can be arbitrarily set.

An operation of the multiprocessor system in the present embodiment will be explained next.

In the following explanation, an explanation is made only for a start-up process from outputting of the reset signal SRST by the system controller 50 according to power-on or instructions from outside, to the setting of a timer interruption interval relating to the OS, and since other operations are the same as that of the conventional multiprocessor system, the explanation thereof will be restrained. And the process which will be explained in the following is carried out according to the boot program to be performed by CPU 10.

Figure 4:
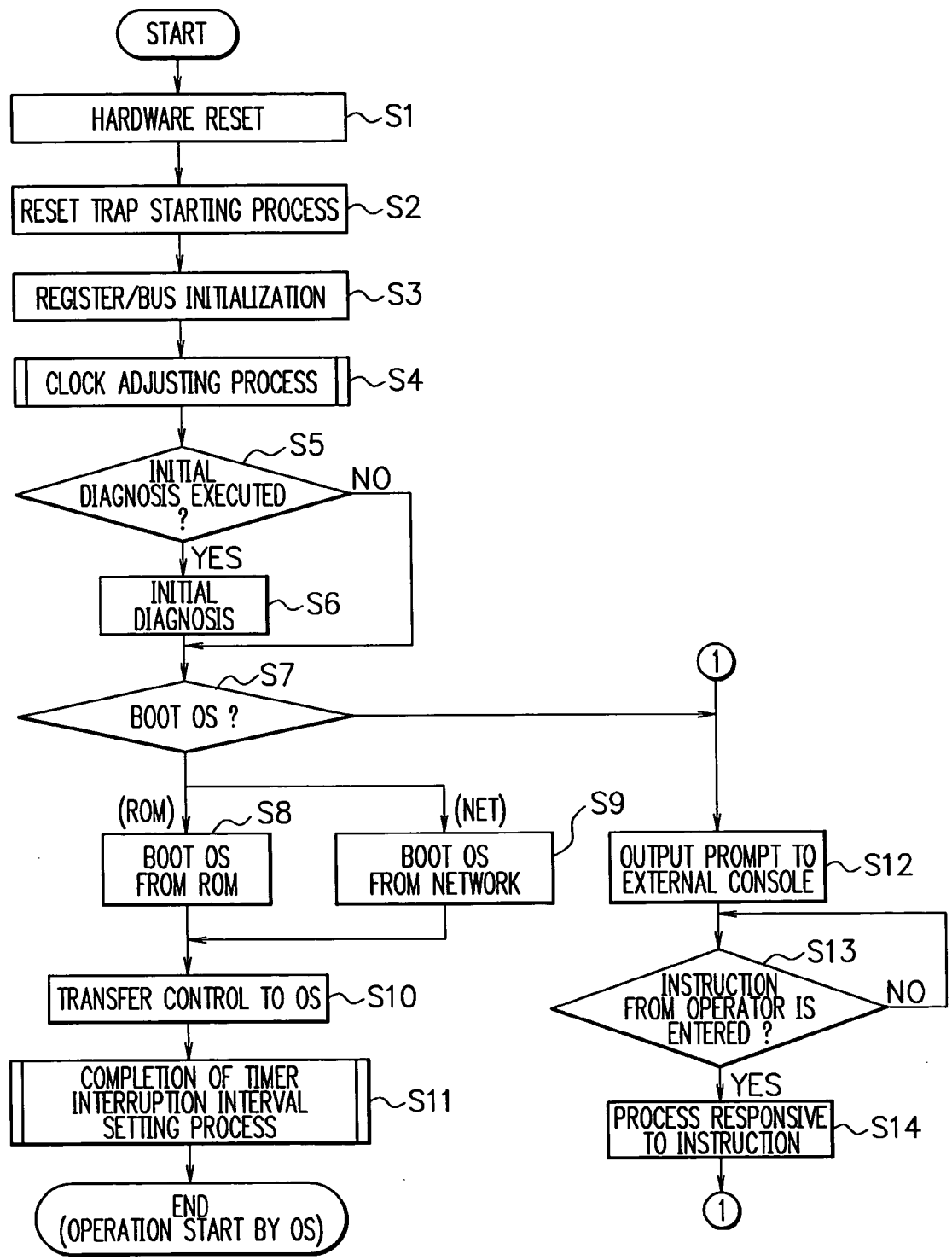
FIG. 4 is a flow chart showing an example of an initialization process of a multiprocessor system in the present embodiment.

FIG. 4 is a flow chart showing an example of the initialization process of the multiprocessor system in the present embodiment.

First, when the system controller 50 outputs a reset signal SRST to each CPU 10, each CPU 10 receiving the reset signal SRST performs hardware resetting to initialize internal registers and the like at step S1.

At step S2, each CPU 10 automatically generates a reset trap when the initialization by a hardware is completed and performs a starting process of the reset trap. More specifically, each CPU 10 sets a prescribed value to a program status word, and at the same time, sets a start-up address for the reset trap execution (Reset Vector) to a program counter. Here, boot program for a system is stored in the ROM 30 beginning from a forefront address, and the forefront address of the ROM 30 is set as the start-up address of the reset trap execution.

Each CPU 10 starts execution of the boot program at step S3. First, each CPU 10 initializes embedded general-purpose registers and other control registers (including the timer 15) and initializes a bus such as address setting of peripheral devices, as preparations of subsequent program execution.

Figure 5:
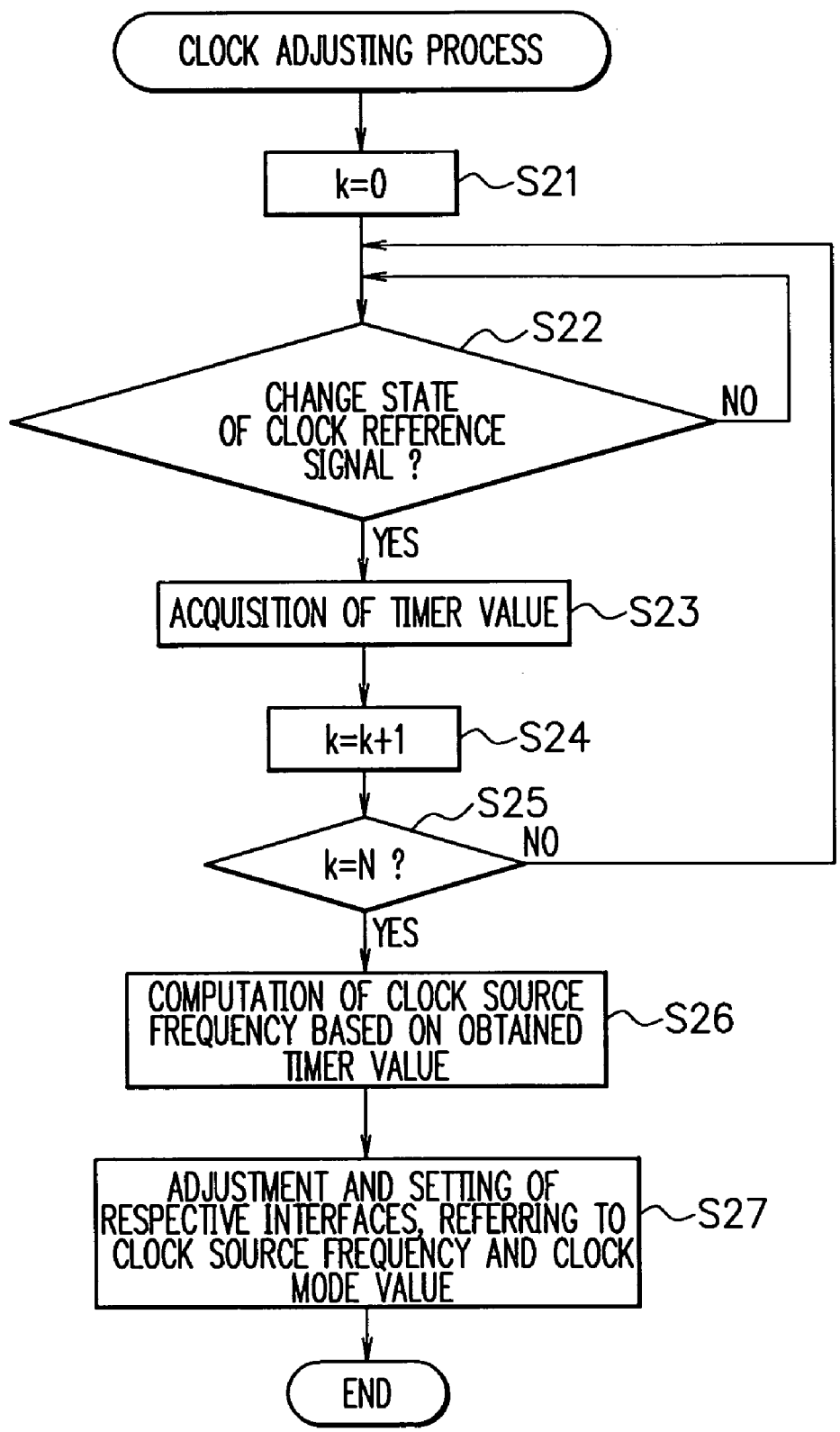
FIG. 5 is a flow chart showing an example of a clock adjusting process.

At step S4, each CPU 10 performs a clock adjusting process shown in FIG. 5 according to supplied clock reference signal RCLK, the clock source SCLK and the clock mode signal CMOD.

FIG. 5 is a flow chart showing an example of the clock adjusting process.

A value of the timer 15 (hereinafter, referred to as "timer value") is always subjected to counting down, using the clock TCK having a predetermined relation with the clock source SCLK (the clock BCK relating to a local bus control is also adaptable).

When the clock adjusting process is started, the CPU 10 initializes a value of parameter k indicating the number of times required to obtain a timer value is initialized to "0" (zero) at step S21.

At step S22, the CPU 10 stands-by till a state changes, referring to the state (high level "H" or low level L") of the clock reference signal RCLK inputted in a general purpose input/output <GPIO> (NO in step S22). Then, when judged that the state of the clock reference signal RCLK is changed (YES in step S22), the CPU 10 advances to step S23, and obtains and stores a timer value at that time.

Then, the CPU 10 increments the value of parameter k by one at step S24, and compares the value of parameter k with the set value N1 at step S25. Here, the set value N1 indicates the number of times to obtain the timer value, and since the frequency of the clock source SCLK is computable if timer values are obtained two times or more, an arbitrary natural number of 2 or more is set as the set value N1. It should be noted that the greater the value of the setting value N1, the greater the accuracy of frequency of the clock source SCLK, but the time required for frequency computation is increased. Therefore, the setting value N1 can be suitably determined on the basis of the computation accuracy of the frequency required, system performance, and the like.

As a result of the judgment at step S25, the value of parameter k differs from a value of the set value N1. In other words, when the timer value has not obtained N1 times yet, the CPU 10 goes back to step S22 to perform the steps S22 to S25.

On the other hand, as a result of the judgment at S25, when the value of parameter k equals a value of the setting value N1, in other words, when N1 times of the timer value acquisition has completed, the CPU 10 goes to step S26, and computes the frequency of the clock source based on the obtained timer value in memory. As described above, the CPU 10 has information in advance on a frequency and a duty ratio of the clock reference signal RCLK. The CPU 10 finds the elapsed number of cycles of the clock source SCLK during certain cycles (the number of cycles is optional) of the clock reference signal RCLK, which is an interval of the timer values obtained by comparing the obtained timer values, and computes the frequency of the clock source based on the elapsed number of cycles.

Figure 7:
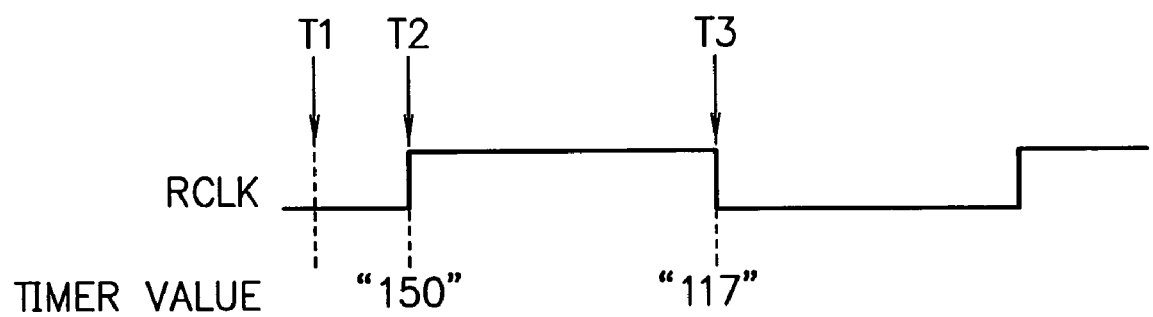
FIG. 7 is a view for explaining a method for computing a frequency of a clock source.

For instance, as shown in FIG. 7, it is assumed that CPU 10 starts referring to a state of the clock reference signal RCLK at the time T1, obtains a timer value (timer value at a first time) "150" at the time T2 when the state changes from "L" to "H", and obtains a timer value (timer value at a second time) "117" at the time T3 when the state further changes from "H" to "L". The frequency of the clock reference signal RCLK is assumed to be 1 MHz and the duty ratio to be 1:1.

In other words, when the elapsed number of cycles of the clock source SCLK is 33 cycles, which means a timer value obtained during a half period of the clock reference signal RCLK is changed by "33", the CPU 10 computes that the frequency of the clock source SCLK is 66 MHz (−33/(½)).

Next, at step S27, CPU 10 performs adjustment and setting of control timing of each interface referring to the frequency of the clock source SCLK computed at the step S26 and a value indicated by the inputted clock mode signal CMOD. CPU 10 performs, for instance, setting of control timing of the MSU 20 composed of memories and the like, an elapsed time since a request is issued to devices (30, 40, etc.) connected to the local bus LB till the response returns, or control timing relating to the so-called latency, or setting of a frequency of a Baud Rate Clock relating to a serial port (console port 70) used as a console. In addition, when a memory composing the MSU 20 is a memory requiring a refreshing operation, the CPU 10 sets the timing of the refreshing.

More concretely, a value indicated by the clock mode signal CMOD is "101" (in binary notation) which defines a frequency ratio (6:2:1:1) of the clock signals CCK, MCK, BCK, and TCK, and a frequency of the clock source is assumed to 55 MHz (17 ns/cycle). In short, frequencies of respective clock signals CCK, MCK, BCK, and TCK outputted from the clock control circuit 14 are assumed to be 330 MHz (CCK), 110 MHz (MCK), 55 MHz (BCK and TCK).

Here, in a memory composing the MSU 20, time relating to access timing or the like such as output timing, output time, and the like of addressing is defined by absolute time generally independent from the clock frequency. In addition, in a memory requiring a refreshing operation, refreshing timing (an output timing, output time, etc. of an address strobe and the like) is also in the same way. When the CPU 10 adjusts and sets control timing of the MSU 20, the number of cycles of respective clock signals outputted from the clock control circuit 14 to correspond to an absolute time defined as a specification of the memory composing the MSU 20 is computed, so that the respective control timing are set using the computed cycle number.

In general, in order to adapt to exterior equipment to be connected with, transmission timing in a serial port is not relative one depending on a clock frequency, but is defined by an absolute time. Accordingly, the CPU 10 computes the number of cycles of the clock signal outputted from the clock control circuit 14 corresponding to one cycle of the Baud Rate Clock, and set a frequency relating to the Baud Rate Clock using the computed cycle number.

When the clock adjusting process has finished as described above, the respective CPUs return to step S5 in FIG. 4.

Returning to FIG. 4, at step S5, the respective CPUs 10 determine whether or not initial diagnosis is executed, referring to a supplied boot mode signal BMOD. When execution of the initial diagnosis is specified by the boot mode signal BMOD as a result of this determination, the initial diagnosis of the CPU 10, the MSU 20, and so on are executed in step S6, and the respective CPUs 10 advance to step S7. In other hand, if execution of initial diagnosis is not specified by the boot mode signal BMOD, step S6 is skipped and goes to step S7.

At step S7, the respective CPU 10 determine whether to boot the OS from the ROM 30, boot the OS via the LAN 80 (network), or stop the OS without booting it, referring to the boot mode signal BMOD.

As a result of this determination, when the OS booting from the ROM 30 is specified by the boot mode signal BMOD, the CPU 10 loads the OS from the ROM 30 at step S8 and advances to step S10. Similarly, when the OS boots-up via the LAN 80 is specified by the boot mode signal BMOD, the CPU 10 loads and boots-up OS from exterior equipment via LAN 80 at step S9, and advances to step S10.

At step S10, the CPU 10 transfers control to booted OS. Then, at step S11, the CPU 10 performs a timer interruption interval setting process shown in FIG. 6.

Here, the timer interruption interval is an interval for the system to request a timer interrupt to the CPU in order to perform process switches and various timing services provided by the OS (for instance, program execution time measurement, initiation of process after designated time, and maintenance management of time) during system operation. The timer 15 is provided with functions to generate periodic interruption to the CPU core, and the interval is arbitrarily adjustable by a value set in the timer 112 and the prescaler 113 shown in FIG. 3.

The timer 15 generates time out interruption when a timer value is decremented to become "0", to transfers control to the OS. When this time out interruption is generated, the OS working in the CPU 10 clears causes for interruption to perform processes such as switching of a user process to another executable process or renewing time to perform the above-described timing service, and then, transfers control to the user process.

Figure 6:
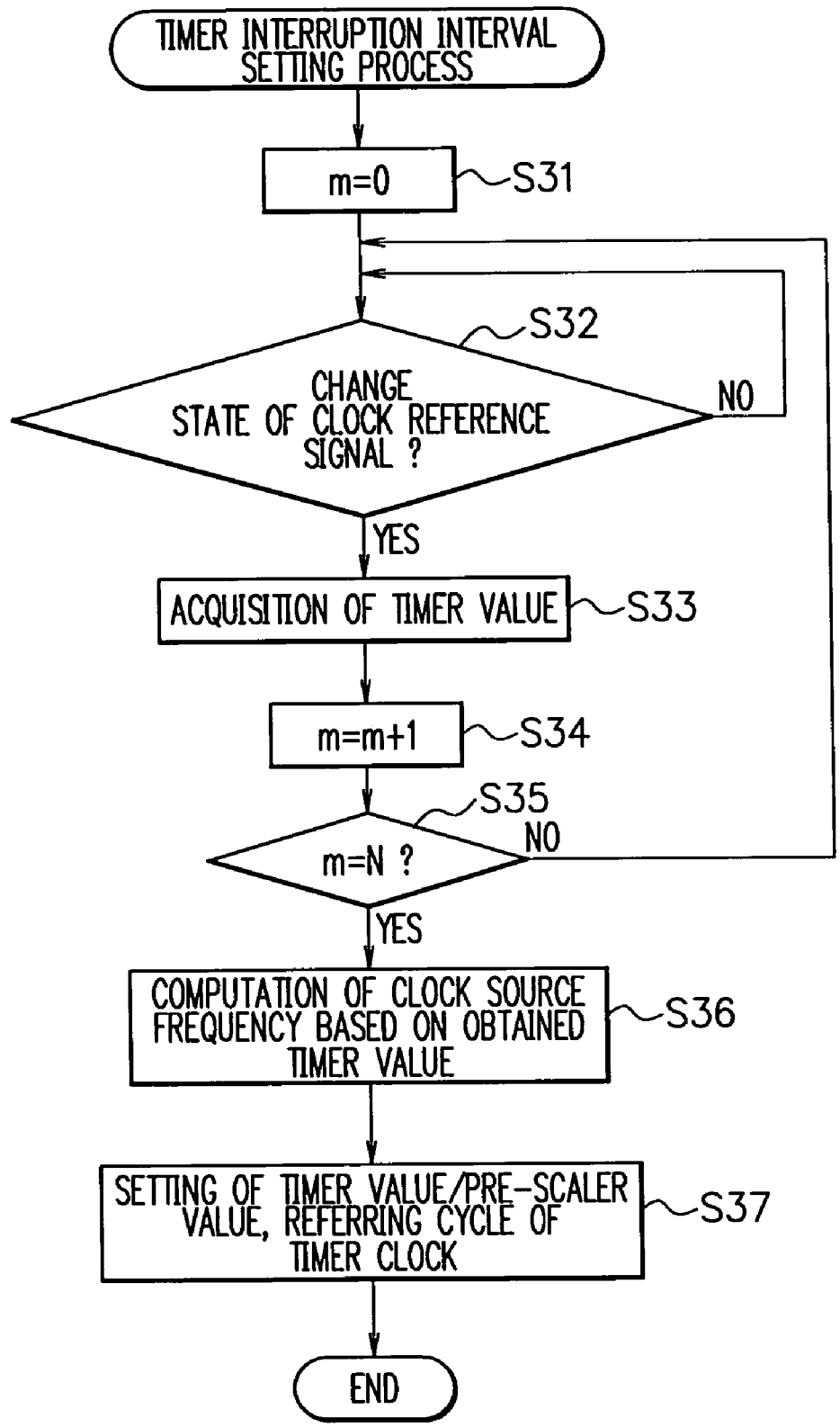
FIG. 6 is a flow chart showing an example of a timer interruption interval setting process.

FIG. 6 is a flow chart showing an example of a timer interruption interval setting process.

Note that a value of the timer 15 (timer value) is always decremented using the clock (timer clock) TCK, similarly to the above-described clock adjusting process.

When the timer interruption interval setting process is started, the CPU 10 initializes a value of parameter m indicating the number of times to obtain a timer value into "0" at step S31.

At step S32, the CPU 10 stands-by till a state changes, referring to the state of the clock reference signal RCLK inputted in a general purpose input/output <GPIO> (NO in step S32). Then, when judged that the state of the clock reference signal RCLK is changed (YES in step S32), the CPU 10 advances to step S33, and obtains and stores a timer value at that time.

Then, the CPU 10 increments the value of parameter m by one at step S34, and compares the value of parameter m with the set value N2 at step S35. Here, the set value N2 indicates the number of times to obtain the timer value, similar to the setting value N1, and an arbitrary natural number of 2 or more is set. It should be noted that the setting value N2 can be suitably determined depending on the accuracy of computing the frequency required, system performance, and the like.

As a result of the judgment at step S35, when the value of the parameter m differs from a value of the set value N2, the CPU 10 goes back to step S32 to perform processing of the steps S32 to S35.

On the other hand, as a result of the judgment at S35, when the value of parameter m equals a value of the setting value N2, the CPU 10 goes to step S36, and computes the cycle of the clock source based on the obtained timer value in memory, similarly to the above-described clock adjusting process. Furthermore, the CPU 10 computes the cycle of the timer clock TCK depending on the frequency of the clock source, based on the frequency of the computed clock source.

Next, at step S37, the CPU 10 computes and sets the value to be set to the timer and the pre-scaler so that an elapsed time from time-out in the timer 15 until the timer value reaches "0" by decrementing, coincides the timer interruption interval, referring to the cycle of the timer clock TCK computed at step S36.

Thus, the timer interruption interval setting process is completed.

Returning to FIG. 4, after completion of the timer interruption interval setting process at step S11, each CPU 10 starts operation by the OS, completing the start-up process.

As a result of determination at the step S7, when halt is designated by the boot mode signal BMOD, the CPU 10 outputs prompt to the external console via the console port 70 and the system controller 50 at step S12.

Then, the CPU 10 stands by until an instruction or command from an operator is entered via the external console. And when the command entered via the external console is supplied via the system controller 50 and the console port 70 at step S13, the CPU 10 performs processes corresponding to the supplied command at step S14. When the processes are completed, the CPU 10 goes back to step S12, and repeats the above-described processing from S12 to S14. It should be noted that when OS booting is instructed by the supplied command on processing of steps S12 to S14, the CPU 10 loads an OS and boots according to the command, and may advance to the step S10.

In addition, in the start-up process shown by the flow chart in FIG. 4, the frequency of the clock source SCLK is computed in the clock adjusting process at step S4 and the timer interruption interval setting processing at step S11 respectively. However, it is also possible to store information on the frequency of the clock source SCLK computed in the processing at step S4 in a storage area readable in the MSU 20 or the ROM 30 (on condition that the ROM 30 is rewritable in this case), and set the timer interruption interval referring to the information at step S11.

As described above, according to the present embodiment, the frequency of the inputted clock source is computed at the time of initialization of the multiprocessor system using the clock reference signal RCLK. Then, adjusting and setting of control timing of various interfaces, relating to the CPU 10 controlled by the internal clock signal generated according to the indicated value based on the frequency of the computed clock source SCLK, referred to the clock mode signal CMOD, are performed. Furthermore, the CPU 10 sets an interruption generation interval to generate interruption regularly to the CPU core 11 (OS operating in the CPU core), based on the computed frequency of the clock source SCLK.

Thereby, since adjusting of control timing of various interfaces and setting of the timer interruption interval during operation of OS according to the frequency of inputted clock source SCLK is automatically performed, even when a frequency of the clock source SCLK is changed, an appropriate control timing and an interruption generation interval in accordance with the frequency can be easily set. Accordingly, change in clock frequency (frequency of the clock source SCLK) of a multiprocessor system can be performed extremely easily without changing of an OS (rebuilding) and costs required for upgrading of a system, or evaluation/inspection of system performance such as a marginal test of an operating frequency can be reduced by reducing work involving a clock frequency change.

According to the present invention, since the frequency value of the clock input signal to be supplied is computed, and the control timing in the microprocessing section is automatically adjusted according to the computed frequency value, even when a clock frequency of an information processing system is changed, a suitable control timing with respect to the frequency can be easily set. Therefore, an information processing system can be easily controlled to cope with clock frequency after change without requiring considerable labor and cost.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. An information processing system, comprising:
   a system control section outputting a clock reference signal having a fixed cycle and a clock input signal having a frequency higher than that of the clock reference signal; and
   a microprocessing section being supplied the clock reference signal and the clock input signal from said system control section, operating based on the clock input signal, and including a processor,
   wherein said microprocessing section, comprises:
   a clock generating section generating an internal clock signal by multiplying or dividing the clock input signal;
   a frequency computing section computing a frequency value of the clock input signal using the clock reference signal; and
   a timing adjusting section adjusting a control timing of an interface embedded in said microprocessing section and operating by the internal clock signal, based on the frequency value of the clock input signal computed by said frequency computing section.

2. The information processing system according to claim 1, wherein said microprocessing section further comprises:
   a time keeping section keeping time using the internal clock signal and generating interruption regularly to an operating system working at said microprocessing section; and
   an interruption time setting section setting an interruption interval to generate the interruption based on the frequency value of the clock input signal computed by said frequency computing section.

3. The information processing system according to claim 2, wherein said time keeping section comprises:
   a first timer in which a value is updated by the internal clock signal; and
   a second timer in which a value is updated by the timer value of the first timer,
   wherein initial values of the first and second timers are set based on the computed frequency value of the clock input signal.

4. The information processing system according to claim 2, wherein the information processing system performs adjustment of control timing of the interface and setting of the interruption interval at the time of initializing the information processing system.

5. The information processing system according to claim 1, wherein said microprocessing section further comprises:
   a cycle number counting section counting an elapsed cycle number of the clock input signal during counting period defined based on the clock reference signal; and
   wherein said frequency computing section computes a frequency value of the clock input signal, based on the elapsed cycle number counted by said cycle number counting section and the counting period.

6. The information processing system according to claim 5, wherein said cycle number counting section includes a timer in which values are updated based on the clock input signal, and counts the elapsed cycle number by obtaining a value of the timer when a situation value of the clock reference signal is changed.

7. The information processing system according to claim 5, wherein the counting period is n/2 cycles (n is an arbitrary natural number) of the clock reference signal.

8. The information processing system according to claim 1, wherein adjustment of the control timing of the interface is performed by a boot program executed at said microprocessing section.

9. The information processing system according to claim 2, wherein setting of the interruption interval is performed by a boot program executed at said microprocessing section.

10. The information processing system according to claim 1, wherein at least either one of the clock reference signal or the clock input signal is able to voluntarily change the frequency.

11. The information processing system according to claim 1, wherein the internal clock signal generated in the clock generating section includes an operating clock signal of the processor and a control clock signal of the interface, and the relation between frequencies of the operating clock signal and the control clock signal is made changeable by the clock control signal.

12. The information processing system according to claim 1, wherein said microprocessing section is composed of plural processors, and the respective processors include said clock generating section, the frequency computing section, and said timing adjusting section.

13. An information processing system, comprising:
   a system control section controlling the system; and
   a microprocessing section including a processor,
   wherein said system control section outputs to said microprocessing section, a clock reference signal having a fixed cycle and a clock input signal higher in frequency than that of the clock reference signal, and allowing the processor to operate, and
   wherein said microprocessing section computes a frequency value of the clock input signal using the clock reference signal, and adjusts a control timing in said microprocessing section based on the computed frequency value of the clock input signal at the time of initializing the information processing system.

14. The information processing system according to claim 13, wherein said microprocessing section generates an internal clock signal by multiplying or dividing the clock input signal, and performs adjustment of the control timing of the interface embedded in said microprocessing section and operating by the internal clock signal, or adjustment of control timing of the interface, based on the computed frequency value of the clock input signal, and setting of interruption interval generating interruption regularly to the operating system working at said microprocessing section.

15. The information processing system according to claim 13, wherein said microprocessing section counts an elapsed cycle number of the clock input signal from a change of a state of the clock reference signal to next change of the state of the clock reference signal, and computes the frequency value of the clock input signal based on the elapsed cycle number measured and the cycle of the clock reference signal.

16. The information processing system according to claim 13, wherein said microprocessing section generates an operating clock signal of the processor and a control clock signal of the interface having a relationship of frequency shown by the clock control signal as the internal clock signal according to the inputted clock control signal, and the relationship of frequency between the operating clock signal and the control clock signal is changeable.

17. The information processing system according to claim 13, wherein at least either one of the clock reference signal and the clock input signal is voluntarily changeable in frequency.

18. A method for timing adjustment of information processing system including a system control section controlling the system, and a microprocessing section including a processor, wherein the microprocessing section comprises:
computing a frequency value of a clock input signal outputted from the system control section higher in frequency than a clock reference signal, and in order to activate the processor, using the clock reference signal having a fixed cycle outputted from the system control section; and
adjusting a control timing of the interface embedded in the microprocessing section operated by an internal clock signal generated by multiplying or dividing the clock input signal, based on the computed frequency value of the clock input signal.

19. The method for timing adjustment according to claim 18, further comprising the step of
setting an interruption time to set an interruption interval for generating interruption regularly into the operating system brought into operation at the microprocessing section based on the computed frequency value of the clock input signal.

* * * * *

UNITED STATES PATENT AND TRADEMARK OFFICE
CERTIFICATE OF CORRECTION

PATENT NO. : 7,337,347 B2
APPLICATION NO. : 10/998151
DATED : February 26, 2008
INVENTOR(S) : Masahito Kubo et al.

It is certified that error appears in the above-identified patent and that said Letters Patent is hereby corrected as shown below:

Column 14, Line 19, after "of" insert --:--.

Signed and Sealed this

Fifteenth Day of July, 2008

JON W. DUDAS
*Director of the United States Patent and Trademark Office*